Figure 5:
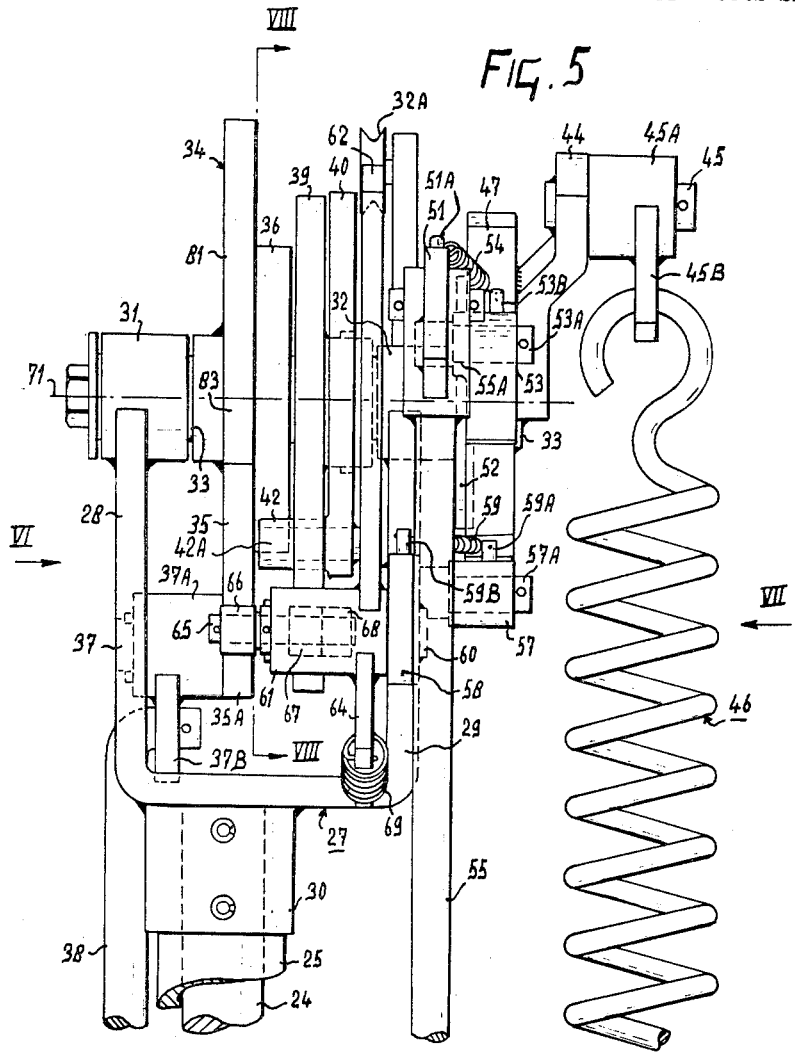

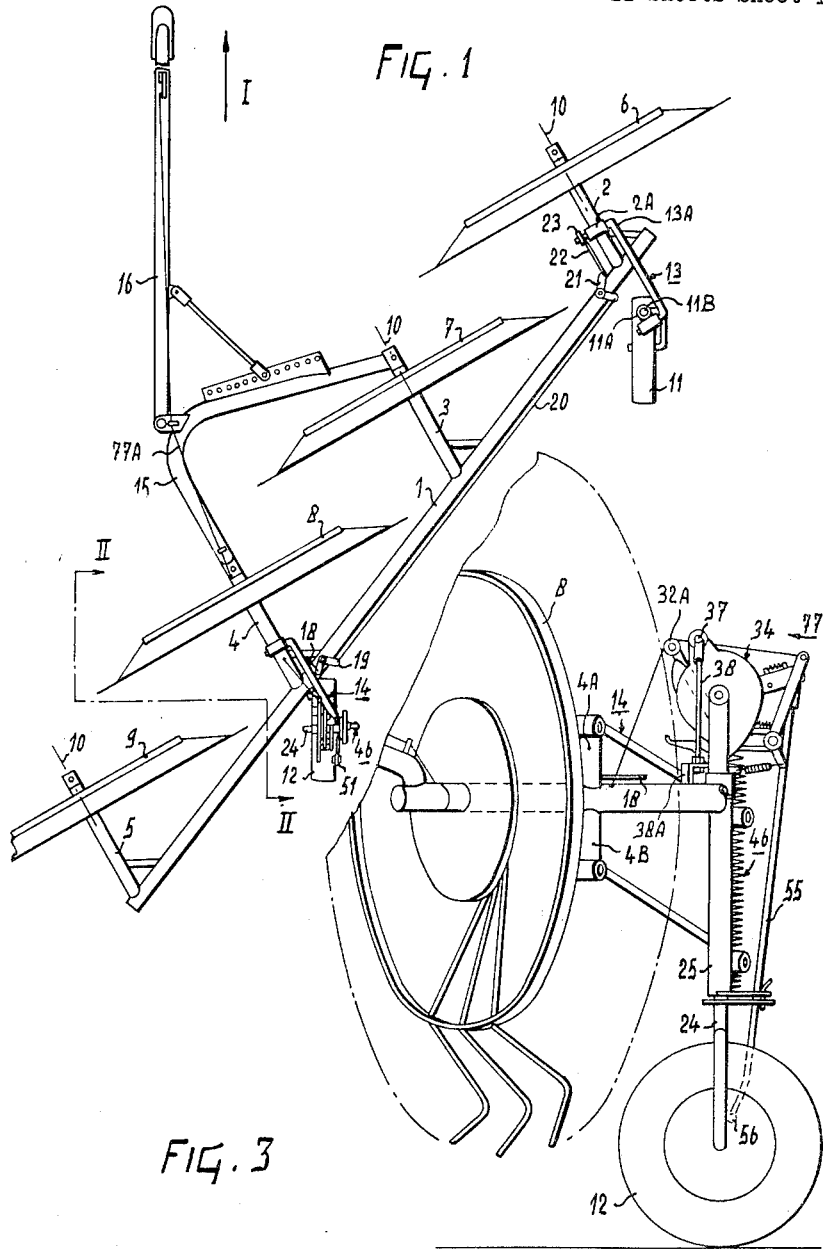

Aug. 28, 1962　　C. VAN DER LELY ET AL　　3,050,926
AGRICULTURAL IMPLEMENTS
Filed Aug. 4, 1959　　　　　　　　　　　　　　11 Sheets-Sheet 2
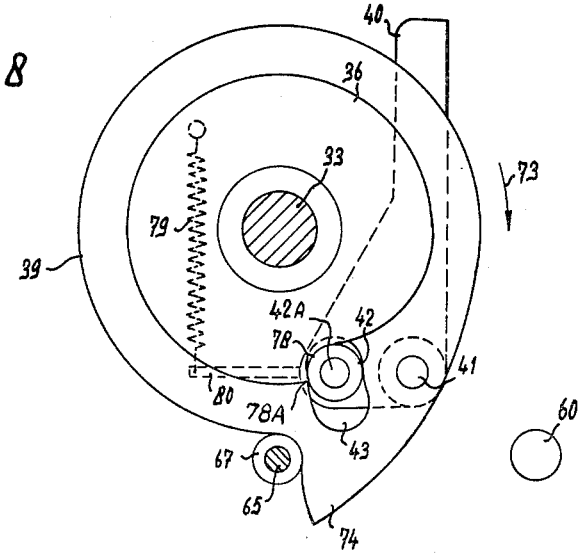
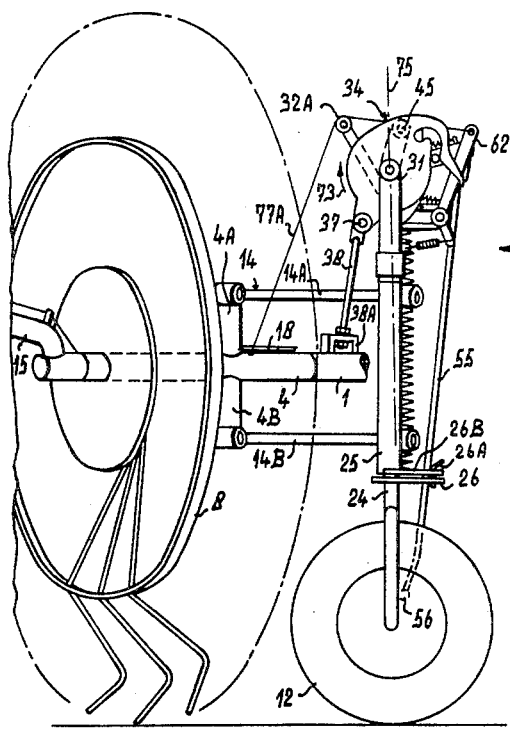
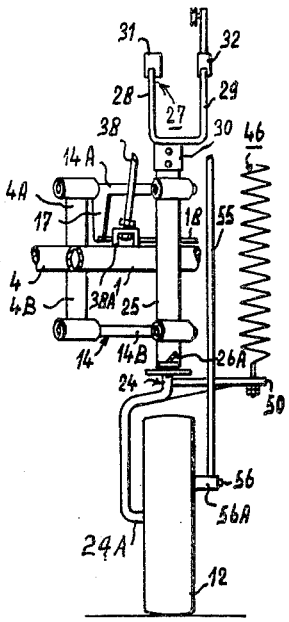
INVENTOR.
Cornelis van der Lely & Ary van der Lely
BY
Mason, Mason & Albright

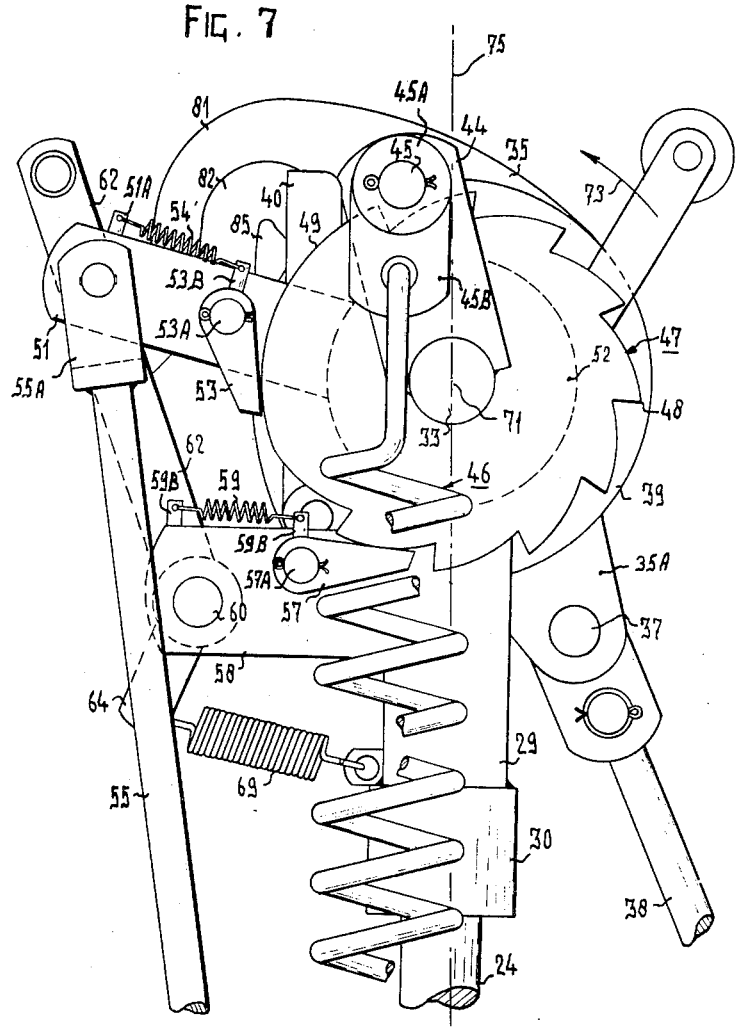

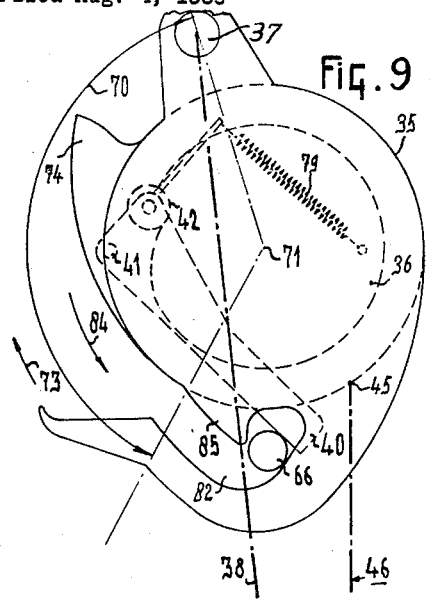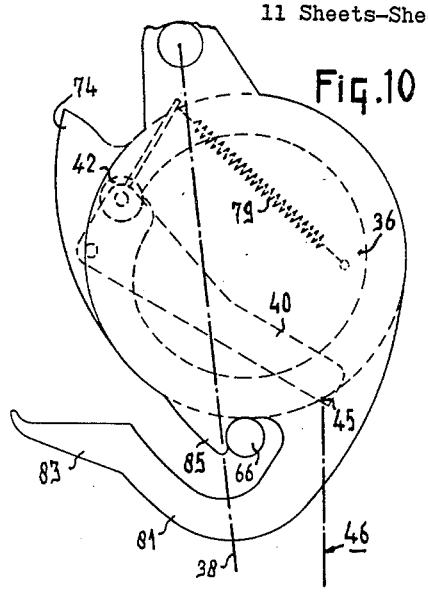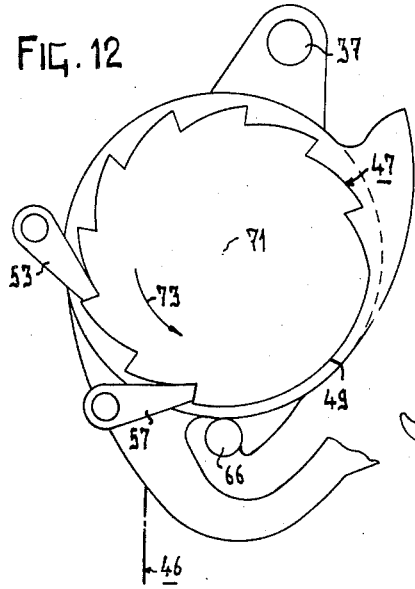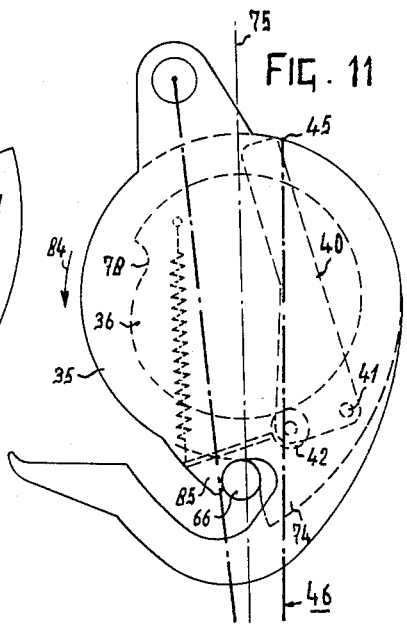

Aug. 28, 1962    C. VAN DER LELY ET AL    3,050,926
AGRICULTURAL IMPLEMENTS
Filed Aug. 4, 1959    11 Sheets-Sheet 7
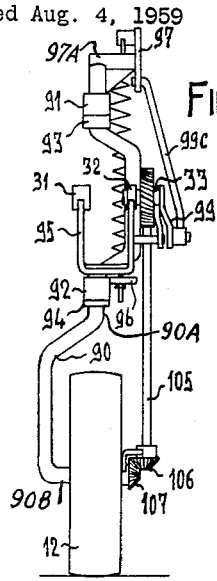
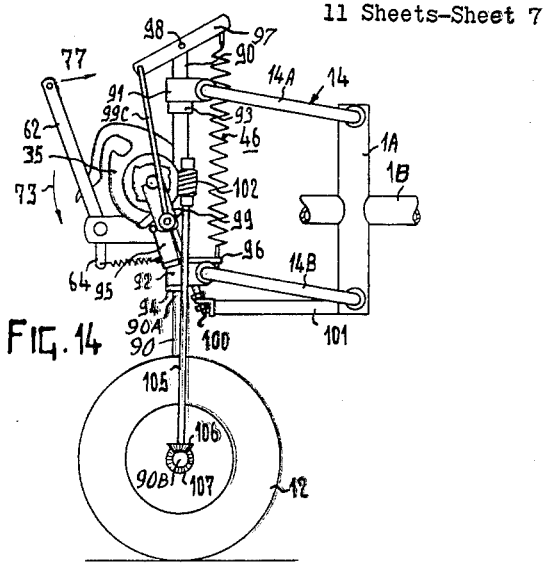
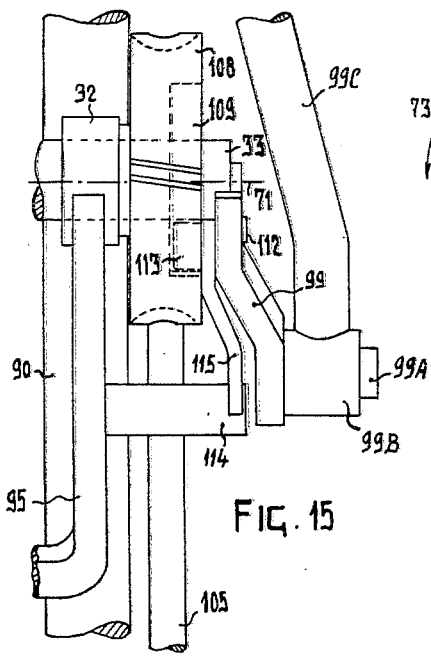
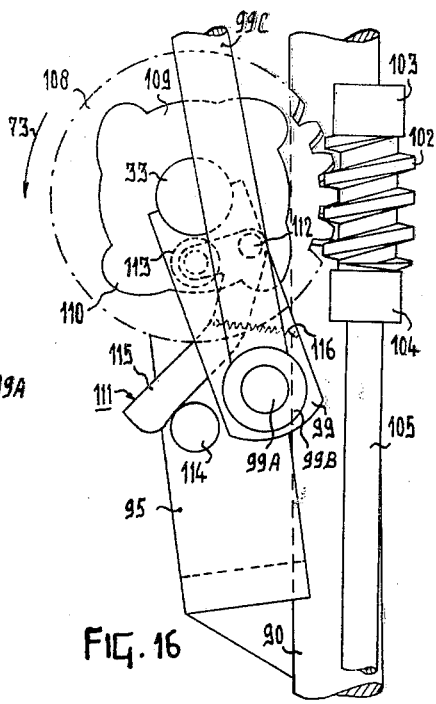

Aug. 28, 1962     C. VAN DER LELY ET AL     3,050,926
AGRICULTURAL IMPLEMENTS
Filed Aug. 4, 1959     11 Sheets-Sheet 8
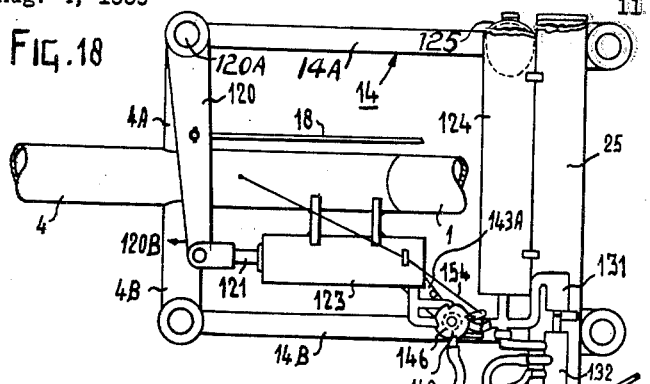
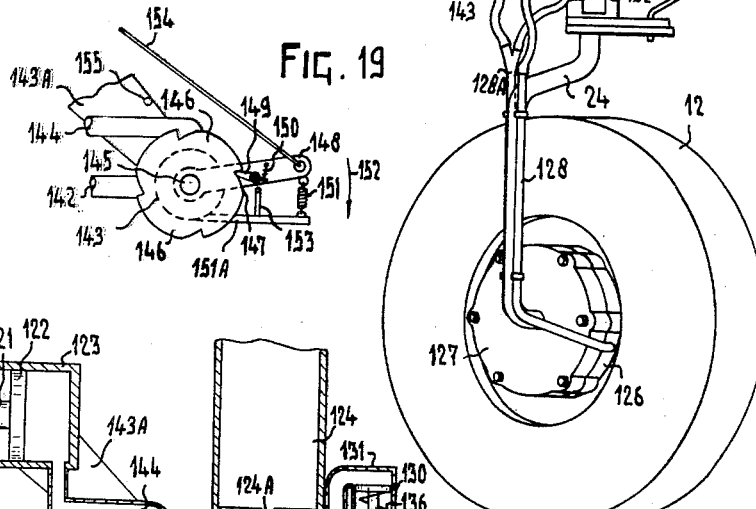
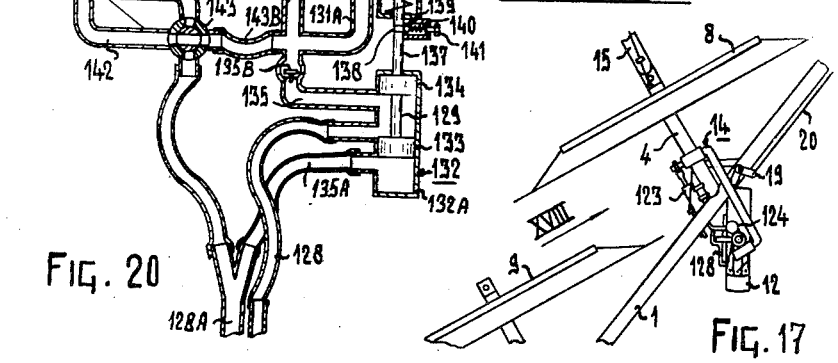
INVENTOR.
Cornelis van der Lely & Ary van der Lely
BY
Mason, Mason & Allright United States Patent Office 3,050,926
Patented Aug. 28, 1962

3,050,926
AGRICULTURAL IMPLEMENTS
Cornelis van der Lely and Ary van der Lely, both of Maasland, Netherlands, assignors to C. van der Lely N.V., Maasland, Netherlands, a Dutch limited-liability company
Filed Aug. 4, 1959, Ser. No. 831,623
Claims priority, application Netherlands Sept. 4, 1958
17 Claims. (Cl. 56—377)

This invention relates to agricultural implements of the kind comprising a frame carrying one or more tools adapted to work the ground or crop thereon when the implement is moved over the ground, the tool or tools being arranged to have more than one setting so that the implement may, for example, occupy a first working position where the tool (or tools) operates (operate) in a particular desired manner, or may be brought to a second working position where the tool (or tools) operates (operate) in a different desired manner. Alternatively, or additionally, a first setting of the tool or tools may correspond to a working position of the implement, and another setting to a transport position in which the tool (or tools) is (or are) raised clear of the ground, so that the implement can be transported from one working site to another. An example of such an implement is a hay rake in which the working tools consist of rake wheels.

With implements of the kind set forth, the change in the setting of the tool or tools of the implement usually calls for the expenditure of considerable physical effort on the part of the user of the implement. It is an object of the invention to provide, in implements of the kind set forth, an actuating mechanism which will allow the setting of the tool or tools to be simply altered without the necessity for any considerable physical effort on the part of the user.

In accordance with the invention there is provided, an implement of the kind set forth, wherein a change in the setting of the tool or tools thereof can be effected with the aid of actuating mechanism which includes an energy accumulator, the latter being adapted to be supplied with energy as the result of movement of the implement over the ground, said actuating mechanism being such that when the user of the implement desires to effect a change in said setting, it is necessary only for the user to bring said mechanism into operation, the power for the change in setting, if such be necessary, being then derived from said energy accumulator.

If the one setting corresponds to a working position of the implement (where the tool or tools thereof is, or are, near, or in contact with, the ground), and another setting corresponds to a transport position of the implement (where the tool or tools thereof is, or are, raised clear of the ground) then it will be understood that external power for the change from said one setting to the other will be necessary. When, however, the change is desired from said other setting to said one setting, the tool or tools can be allowed to fall from the raised condition without the necessity of supplying energy from the energy accumulator. In a similar way, if the tool (or tools) is (or are) biased by spring means to occupy a particular setting in relation to the intended direction of travel of the implement (corresponding to a first working position of the implement), and can be brought to another setting in relation to said direction (corresponding to a second working position), against the action of the spring bias, said actuating mechanism may be arranged to supply energy for effecting the change only when the implement is brought from said first to said second working position, the energy of the biasing spring means being available for changing from said second to said first working position.

The energy accumulator may consist of spring means, stressed as the result of movement of the implement over the ground, or a rotating mass system maintained in rotation as the result of said movement, or a gas cushion held in compression as the result of said movement.

Figure 6:
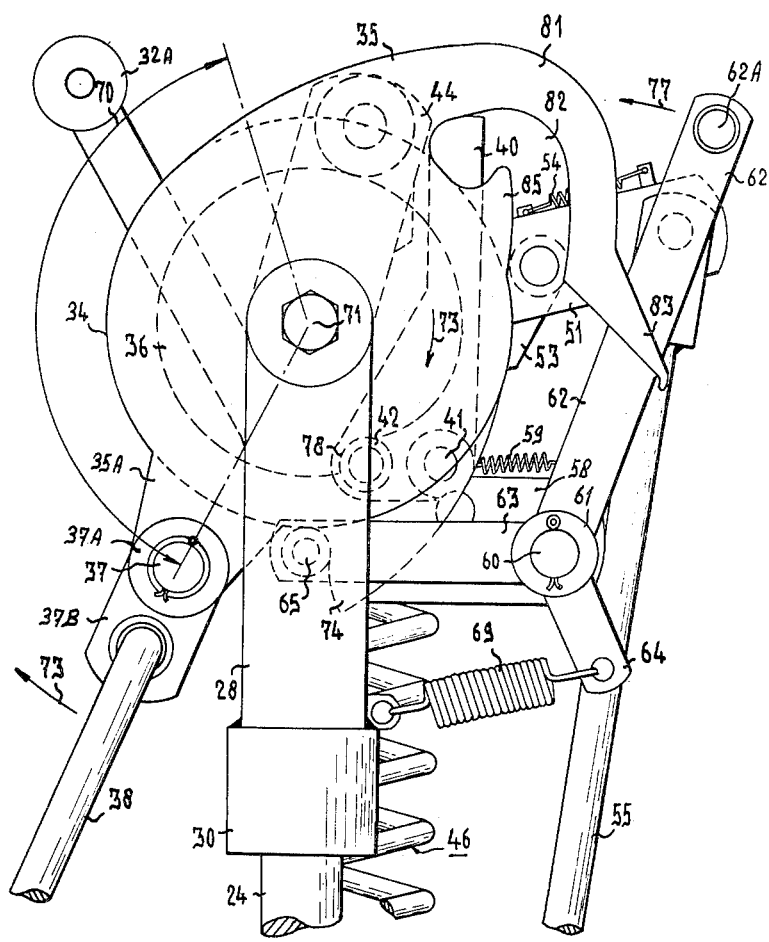
Figure 21:
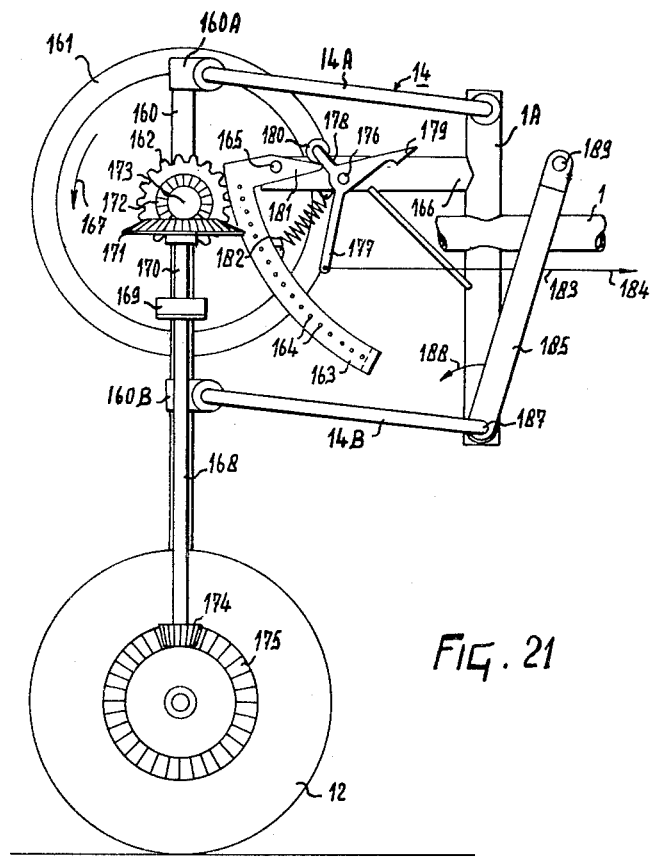
Figure 22:
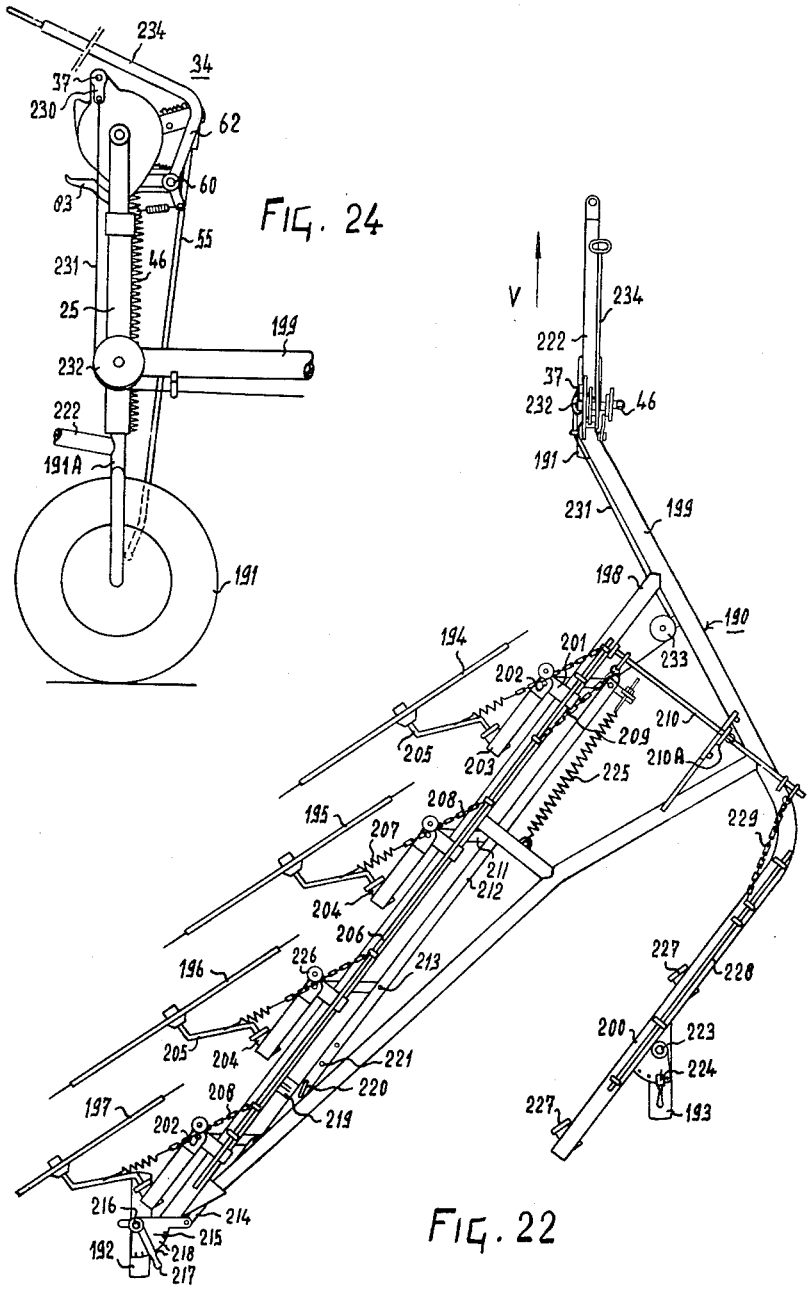
Figure 23:
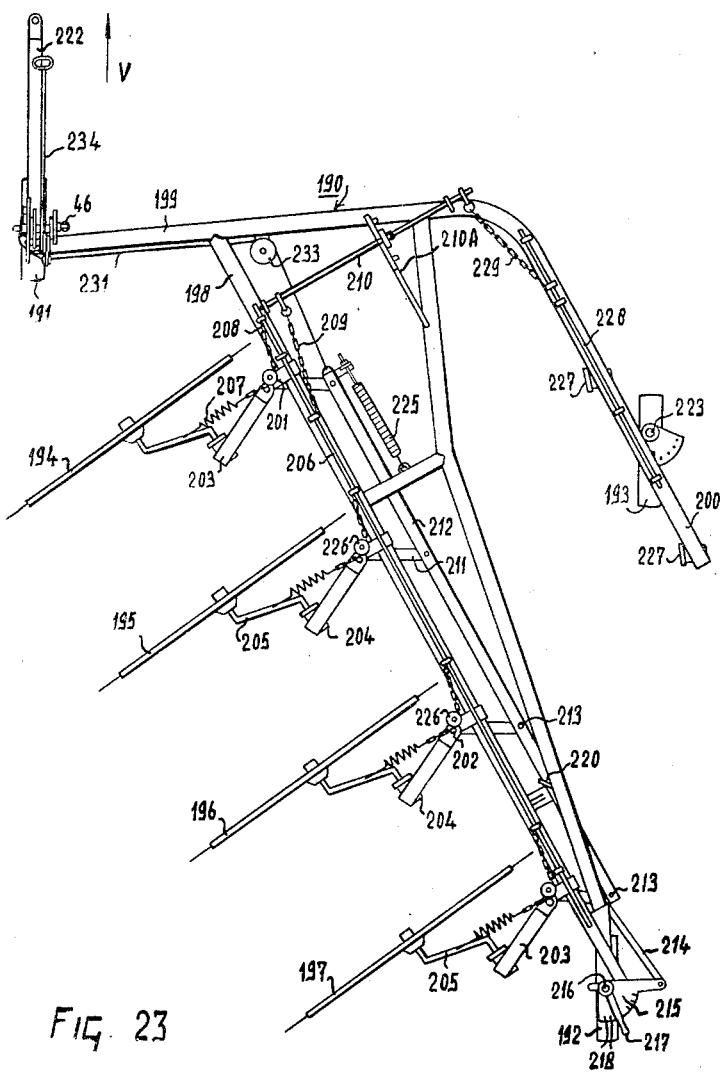

For a better understanding of the invention, and to show how the same may be carried into effect, reference will now be made, by way of example, to the accompanying drawings, in which:

FIGURE 1 is a plan view of an agricultural implement to which the invention has been applied, FIGURE 2 shows to an enlarged scale, a detail of the implement shown in FIGURE 1, as seen from the line II—II of FIGURE 1, FIGURE 3 is similar to FIGURE 2, but shows another operative position, FIGURE 4 is an elevation as seen in the direction of the arrow IV in FIGURE 2, FIGURE 5 is a view similar to FIGURE 4, but showing only a part thereof, to an enlarged scale, FIGURE 6 is an end view corresponding to FIGURE 5, as viewed in the direction of the arrow VI, FIGURE 7 is similar to FIGURE 6, but as viewed in the direction of the arrow VII in FIGURE 5, FIGURE 8 is a section taken on the line VIII—VIII of FIGURE 5, FIGURES 9, 10 and 11 are diagrammatic views similar to FIGURE 6, but showing different operative positions, FIGURE 12 is a diagrammatic view similar to FIGURE 7, but showing a different operative position, FIGURE 13 is a view similar to FIGURE 2 but showing a modification, FIGURE 14 is a side elevation corresponding to FIGURE 13, FIGURE 15 shows to an enlarged scale, a detail of FIGURE 13, FIGURE 16 is a side elevation corresponding to FIGURE 15, FIGURE 17 is a view similar to FIGURE 1, but showing only a modified part of the implement, FIGURE 18 is, to an enlarged scale, a view as seen in the direction of the arrow XVIII in FIGURE 17, FIGURE 19 is, to an enlarged scale, a view of a detail of FIGURE 18, FIGURE 20 is a diagrammatic view showing the hydraulic circuit employed for the construction shown in FIGURES 17 to 19, FIGURE 21 is a view similar to FIGURE 14, but showing a modification, FIGURE 22 is a plan view of another agricultural implement to which the invention has been applied, FIGURE 23 is a plan view of the implement shown in FIGURE 22, but in another working position, and FIGURE 24 is an enlarged side elevation of part of the implement shown in FIGURES 22 and 23.

Referring first to FIGURE 1 of the drawings, there is shown an implement for laterally displacing crop lying on the ground, the implement being in the form of a side delivery rake, the working tools of the implement consisting of rake wheels 6, 7, 8 and 9. The implement has a frame consisting of a principal frame beam 1 and four transverse frame beams 2, 3, 4 and 5 which extend forwardly from the beam 1, and on which the rake wheels 6, 7, 8 and 9 are mounted. Each of the rake wheels is arranged to be freely turnable about an axis indicated at 10, each such axis co-inciding with the centre line of the associated transverse beam which supports the rake wheel concerned. The axes 10 and the axis of the frame beam 1 lie all in the same plane. The frame of the implement is supported on two ground wheels 11 and 12, respectively connected with the transverse beams 2 and 4 by parallelogram link structures generally indicated at 13 and 14. The beams 3 and 4 are interconnected forwardly of the rake wheels 7 and 8 by a beam 15. The implement is intended to be towed in the direction indicated by the arrow I, and in order that the beam 15 should not undesirably encounter crop to be worked by the rake wheels, the beam 15 extends upwardly from the locations where it is joined to beams 3 and 4.

A draw bar 16 is at one end attached to the beam 15, the forward end of the draw-bar being adapted for coupling to a tractor or the like for towing the implement. When the implement is being towed, the rake wheels, which constitute the working tools of the implement, occupy either of two settings, the first being where they are in engagement with the ground and/or the crop lying thereon, corresponding to the working position of the implement, and the second being where the rake wheels are raised from the ground out of their working position, corresponding to the transport position for the implement. It will suffice here to indicate that in the working position when the implement is moved in the direction I, the rake wheels will rotate by virtue of their contact with the ground and/or the crop lying thereon, the first rake wheel 6 displacing the crop into the path of the second rake wheel 7, until finally the last rake wheel 9 displaces the crop laterally, whereby the implement will operate as a side-delivery rake.

In order to move the rake wheels from the setting corresponding to the working position, to the setting corresponding to the transport position, the frame is raised in relation to the ground wheels 11 and 12, by adjusting the parallelogram link structures 13 and 14 which interconnect the ground wheels and the frame. For this purpose there is provided actuating mechanism which will forcibly adjust the parallelogram link structures to raise the frame and to hold the frame in the raised position.

The parallelogram link structure 14 associated with the ground wheel 12 can be seen in detail in FIGURES 2 and 3 to which attention is now directed. In FIGURE 2 the structure is shown in the position corresponding to the working position of the implement and in FIGURE 3 the structure is shown in the position corresponding to the transport position.

The beam 4 has aligned brackets 4A and 4B secured thereto which together constitute the vertically displaceable link of the structure. There are parallel top and bottom links 14A and 14B which are pivotally connected with the brackets 4A and 4B and which are also pivotally connected to the exterior of a bearing sleeve 25. The bearing sleeve 25 constitutes the stationary upright link of the parallelogram link structure. The sleeve 25 supports a shaft 24, the lower end of which (as can be seen best in FIGURE 4) is bent to form a horizontal axle 24A for the rotatable mounting of the ground wheel 12. The axis of the shaft 24 passes through the rotational axis of the ground wheel 12, and hence this ground wheel 12 acts as a direction control wheel which must be fixed in its setting about the axis of the shaft 24. The ground wheel 12 will normally be locked in a position such as shown in FIGURE 1 in which the wheel plane lies in the intended direction of travel of the implement. The shaft 24 has a plate 26 fixed thereto, the plate being formed with a series of holes into any one of which a locking pin 26A can be introduced. The locking pin 26A is entered in a hole formed in an arm 26B which overlies the plate 26, and which is fixed to the sleeve 25. By releasing the locking pin 26A, the setting of the ground wheel 12 may be adjusted, the setting being thereafter locked by introducing the locking pin 26A into an appropriate registering hole in the plate 26.

The upper link 14A has an integral depending arm 17, the lower end of which is connected to a rod 18. As will be seen from FIGURE 1, the rod 18 is connected with one arm of a bell-crank lever 19 mounted on the beam 1. The other arm of the bell-crank lever 19 is connected by a rod 20 to a further bell-crank lever 21 also mounted on the beam 1. The bell-crank lever 21 has the other arm thereof connected by a rod 22 with one end of an arm 23. The parallelogram link structure 13 is shown only in FIGURE 1, but it will be appreciated that it is similar to the parallelogram link structure 14 which has been illustrated in detail in FIGURE 4. Thus there is an upper link 13A corresponding to the upper link 14A. There is likewise a lower link (not shown), both the upper and lower links being pivotally attached to a stationary upright link constituted by a bearing sleeve 11A. The upper and lower links are also pivotally attached to a vertically displaceable link consisting of brackets extending from the beam 2 in the same way as the brackets 4A and 4B extend from the beam 4. One of the brackets associated with the beam 2 is seen at 2A. It will be noted that the end of the link 13A which is pivotally connected to the bracket 2A passes through the bracket 2A and has the arm 23 fixed thereon. The arrangement of the arm 23 and the interconnecting system 18, 19, 20, 21 and 22 is such that when the parallelogram link structure 14 is in the position shown in FIGURE 2, the rod 22 exerts no force on the arm 23 and the parallelogram link structure 13 occupies a similar position to the structure 14. When, in a manner to be explained hereinafter, the parallelogram link structure 14 is adjusted so as to lift the frame beam in the manner illustrated in FIGURE 3, then it will be apparent that the arm 17 (which is obscured by the bracket 4A in FIGURES 2 and 3) will pull the rod 18 with the result that the arm 23 will suffer a displacement in sympathy with the arm 17, whereby the parallelogram link structure 13 will be brought to a position of adjustment similar to that shown for the structure 14 in FIGURE 3. Hence the frame carrying the rake wheels 6 to 9 will be raised to the transport position.

Whereas it will have been noted that the ground wheel 12 acts as a direction control wheel and can be adjusted to occupy various settings with the aid of the locking device including the locking pin 26A, it will be observed from FIGURE 1 that the ground wheel 11 is arranged as a trailing caster wheel. The ground wheel 11 is carried upon a vertical shaft 11B turnably disposed in the bearing sleeve 11A. The lower end of the shaft 11B is bent so that it is formed as a horizontal axle for the ground wheel, such axle being horizontally spaced from the vertical plane containing the axis of the shaft 11B at the upper end of the latter.

The actuating mechanism for adjusting the parallelogram link structure 14, and hence the companion structure 13, is carried upon the upper end of the shaft 24. This actuating mechanism will be described later in detail and it will for the moment suffice to indicate that the beam 1 has a bracket in the form of a staple 38A fixed thereto. A hole is formed in the upstanding central portion of the bracket and one end of a rod 38 is entered in the hole, there being a nut on either side of the bracket for anchoring the end of the rod loosely in the hole. The actuating mechanism can exert a pull on the rod 38 to raise the frame of the implement from the position shown in FIGURES 2 and 4 to the position shown in FIGURE 3. When the rod 38 is released, the frame can move down under the action of its own weight to the position shown in FIGURES 2 and 4.

As already indicated, the actuating mechanism is mounted at the upper end of the shaft 24. The upper end of the shaft 24 protrudes through the sleeve 25, and as can be seen best in FIGURE 4, a collar 30 being fixed to the protruding end, such collar having rigidly connected therewith a U-bracket 27. The latter includes arms 28 and 29 terminating in aligned bearing blocks 31 and 32. In FIGURE 4 the mechanism supported in the bearing blocks 31 and 32 has been omitted for simplicity of drawing, but such mechanism is shown to a larger scale in FIGURE 5, to which attention is now directed. In FIGURE 5 the aligned bearing blocks 31 and 32 are shown as having a common axis 71. A shaft 33 is mounted in these bearing blocks, the centre line of the shaft being co-incident with the axis 71. Freely turnably mounted upon the shaft 33, is a composite cam device 34 which comprises two effectively integral cam discs 35 and 36, the cam disc 35 being of greater size than the disc 36. The shape of the cam disc 35 is seen best in FIGURE 6, from which it will be apparent that there is a peripherally extending lug 35A carrying a pin 37. A collar 37A is mounted upon the pin and is formed with an effectively integral lug 37B. The latter has an aperture in which there is entered the cranked end of the rod 38 previously described. The cam disc 35 additionally has a finger 81 which first extends substantially tangentially from the disc, and then extends in a circumferential direction so as to enclose a space forming a slot 82. The free end 83 of the finger is broadened and is shaped to produce a flared entry mouth for the slot 82. Within the slot 82 the periphery of the cam disc has a nose-shaped crest 85.

The cam disc 36 of the composite cam device 34, has a shape which can best be seen in FIGURE 8. It will be seen that the cam disc 36 is generally of the form of a snail cam, having a deep cavity 78 adjacent the crest 78A of the cam.

From FIGURE 5 it will be observed that adjacent the composite cam device 34, there is mounted on the shaft 33 a cam disc 39, such disc being rigidly attached to the shaft 33 so as to be turnable only therewith. The shape of the cam disc 39 is seen best in FIGURE 8, and it will be noted that this cam disc has also the general shape of a snail cam with a relatively great crest 74. The cam disc 39 is also formed with an arcuate slot 43.

Turning once more to FIGURE 5, it will be seen that adjacent the cam disc 39 there is positioned a latch 40. The shape of the latch 40 is best seen in FIGURE 8, and it will be apparent that the latch is formed as a bell-crank lever having a pivotal mounting 41 upon the adjacent face of the cam disc 39. The longer arm of the bell-crank lever is upstanding, and the shorter arm thereof extending from the pivotal mounting 41 has a pin 42A projecting therefrom and passing through the slot 43 formed in the cam disc 39. As appears from FIGURE 5, the pin 42A extensd through and beyond the cam disc 39. A roller 42 is mounted on the pin 42A, such roller engaging the walls of the slot 43 and extending through such slot to a location where it can engage the periphery of the cam disc 36. The shorter arm of the bell-crank lever constituting the latch 40, has a finger 80 (see FIGURE 8) extending therefrom, the end of such finger being connected with one end of a tension spring 79 anchored at its other end to the adjacent face of the cam disc 39. It will be realised that the spring 79 will serve to tend always to swing the latch 40 in a clockwise direction about the pivotal mounting 41 as seen in FIGURE 8.

Returning once more to FIGURE 5, it will be noted that the cam disc 39 carrying the latch 40 is the last of the elements mounted between the bearing blocks 31 and 32. The shaft 33 does, however, extend beyond the bearing block 32, and just beyond such block there is a disc 52 mounted on the shaft. The disc 52 is freely turnable upon the shaft 33 and has a radially outwardly extending arm 51. The shape of the disc 52 and its arm 51 can best be seen in FIGURE 7. The outer end of the arm 51 has pivotally secured thereto a yoke 55A attached to the end of a rod 55. Intermediate its ends, the arm 51 has a pin 53A secured thereto, such pin forming a pivotal support for a pawl 53. The latter is formed with an upstanding finger 53B to which one end of a spring 54 is anchored. The other end of the spring is anchored to a finger 51A fixed to the arm 51. The spring 54 urges the pawl against a ratchet wheel 47, the latter having ratchet teeth 48 over the major part of its circumference, but a blank portion 49 free of ratchet teeth. The ratchet wheel 47, the shape of which can best be seen in FIGURE 7, is fixed to the shaft 33. A crank arm 44 is rigidly attached to the ratchet wheel 47 (see FIGURES 5 and 7), the outer end of the arm 44 having a pin 45 fixed thereto. A collar 45A is turnable on the pin 45 and has a depending lug 45B formed with an aperture for the anchorage of one end of a tension spring 46.

The arm 29 of the U-bracket 27 is formed with a lateral extension 58, the shape of which can best be seen from FIGURE 7. A pin 57A is fixed to the extension 58 and pivotally supports a pawl 57, which is urged towards the ratchet wheel 47 by means of a spring 59 one end of which is anchored to a finger 59A carried by the extension 58, and the other end of which is anchored to a finger 59B carried by the pawl itself. The extension 58 has another pin 60 fixed thereto. A collar 61 is mounted on the pin 60 so as to be freely turnable thereon, the collar effectively forming part of a three-armed lever comprising arms 62, 63 and 64. This three-armed lever can best be seen in FIGURE 6. The arm 64 has one end of a tension spring 69 anchored thereto, the other end of such spring being anchored to the U-bracket 27. The arm 62 extends upwardly to a location where it is formed with an aperture 62A intended for the anchorage of a control cable as will be hereinafter explained. The arm 63 extends to a location just beneath the shaft 33 and carries a pin 65 extending parallel therewith. As appears best from FIGURE 5, the pin 65 has rollers 66, 67 and 68 mounted thereon. The roller 66 is intended to cooperate with the cam disc 35, the roller 67 with the cam disc 39 and the roller 68 with the latch 40.

In FIGURES 5, 6 and 7 the previously mentioned spring 46 is shown broken-away at its lower end. The lower end of the spring is seen in FIGURES 2, 3 and 4. From FIGURE 4 it will be noted that the shaft 24 of the ground wheel 12 has a laterally projecting bracket 50 secured thereto. The lower end of the spring 46 is anchored to the projecting free end of the bracket 50. In like manner, in FIGURES 5, 6 and 7 the rod 55 is shown broken-away. This rod can also be seen completely in FIGURES 2, 3 and 4. In these figures there is shown a crank pin 56 secured to the side of the ground wheel 12. A collar 56A is freely turnable on the crank pin and the lower end of the rod 55 is rigidly attached to the collar. It will be understood that as the ground wheel 12 rotates by virtue of the travel of the implement over the ground, the crank pin 56 will cause the rod 55 to be reciprocated. Hence the arm 51 will oscillate about the axis 71 of the shaft 33. It will be recalled that the disc 52 is free upon the shaft 33, and the only effect of such reciprocation will be to cause the pawl 53 to be reciprocated whilst in contact with the ratchet wheel 47. So long as the pawl 53 encounters the ratchet teeth 48, the reciprocation of the pawl will cause the ratchet wheel to be displaced angularly in the direction indicated by the arrow 73 in FIGURE 7. The check pawl 57 prevents rotation of the ratchet wheel in the opposite direction.

In FIGURES 2 and 7 a chain line 75 has been drawn, such line passing through the axis 71 of the shaft 33 and also through the anchorage point of the spring 46 upon the bracket 50. It will be recalled that the upper end of the spring 46 is attached to the pin 45 which is effectively integral with the ratchet wheel 47. The spring 46 is always maintained in tension, and, as viewed in FIGURE 7, on the left-hand side of the line 75 the tension in the spring 46 will tend to turn the ratchet wheel 47 in the direction of the arrow 73 i.e., counterclockwise as viewed in FIGURE 7. When the axis of the pin 45 is located on the line 75 either above or below the shaft 33, the dead-centre position is reached where no torque is exerted upon the ratchet wheel. As soon as the pin 45 passes through the top dead-centre position whilst moving angularly about the axis 71 in the direction of the arrow 73, the spring 46 will tend to rotate the ratchet wheel until the pin 45 is brought to the bottom dead-centre position. As the pin 45 continues to move angularly towards the right-hand side of the line 75, it will be appreciated that the spring 46 has to be extended and work must be done to restore the pin 45 to the top dead-centre position. Energy for this work is derived from the ground wheel 12, since the latter causes the rod 55 to be reciprocated and hence causes the pawl 53 to turn the ratchet wheel stepwise. In FIGURE 7 it will be noted that the pin 45 has just passed the top dead-centre position. Continued reciprocation of the rod 55 and the pawl 53 will be of no effect since the pawl 53 now cooperates with the untoothed portion 49 of the ratchet wheel 47. If the ratchet wheel 47 is released so that it can rotate under the effect of the energy stored in the spring 46, the movement of the ratchet wheel will itself bring the teeth thereof to a position where they can be engaged by the pawl 53 whereby the ratchet wheel can be restored to the position illustrated in FIGURE 7. Hence the spring 46 acts as an energy accumulator in the sense that the pin 45 can be held in the position where it has just passed the top dead-centre, and when energy is required from the spring it is simply necessary to release the ratchet wheel, the ratchet wheel imparting torque to the shaft 33 until the bottom dead-centre is reached, whereupon the energy accumulator in the form of the spring is recharged.

The energy accumulator is used for actuating the cam disc 35. When the implement is in the working position shown in FIGURE 2, the composite cam device 34, which includes the cam disc 35, occupies the position shown in this figure. By turning the cam device 34 in the direction indicated by the arrow 73 i.e. clockwise as viewed in FIGURE 2, the implement is brought to the transport position shown in FIGURE 3, the cam device having then moved through about 140°. In FIGURE 6 the angle through which the cam device moves is indicated by the arcuate line 70. In the position of the actuating mechanism shown in FIGURE 6, the spring 46, forming the energy accumulator, is in the position shown in FIGURE 7. The pin 45 is held from moving under the action of the spring 46 for the reason that the roller 67 is seated in the cavity at the foot of the crest 74 of the cam disc 39. It will be recalled that the roller 67 is mounted on the pin 65 which is turnable about the relatively fixed pin 60. In FIGURE 8 the co-operation of the cam disc 39 with the roller 67, which results in locking of the ratchet wheel 47, is illustrated, the pin 60 being shown merely in outline.

If now the arm 62 is caused to move in the direction indicated by the arrow 77 in FIGURE 6, it will be appreciated that the roller 67 will be withdrawn from the crest 74 whereby the cam disc 39 will be free to move, and hence the shaft 33 can turn with the ratchet wheel 47 under the action of the spring 46. At this time, the roller 42 carried by the latch 40 and projecting through the slot 43, is seated in the cavity 78 of the cam disc 36. The spring 79 of the latch 40 ensures that the roller 42 is maintained in this position, and hence rotary motion of the cam disc 39 in the direction 73 indicated in FIGURE 8, will cause the cam disc 36 to be similarly rotated. The cam disc 36 is effectively integral with the cam disc 35, and so the latter is similarly rotated whereby the pin 37 is powerfully moved in the direction of the arrow 73 shown in FIGURE 6, the rod 38 being thus lifted. As the cam disc 35 moves angularly away from the position shown in FIGURE 6, the roller 66 runs on the periphery of the cam disc 35. The roller 66 will firstly encounter the crest 85 and will lift to run in the slot 82. The lifting of the roller 66 with consequent similar displacement of the companion rollers 67 and 68 will be of no effect. It will incidentally be noted that the flared mouth of the slot 82 ensures that the roller 66 will be picked up and guided into the slot 82 even if for some reason the spring 69 is ineffective in holding the roller 66 upon the periphery of the cam disc 35.

In FIGURE 9 the position of the actuating mechanism is shown where the roller 66 has just passed the crest 85 and the pin 37 has substantially completed its movement through the angle 70 in the direction shown by the arrow 73. For convenience in drawing, the rod 38 has been shown simply as a chain line and the spring 46 has been similarly illustrated, only the centre of the pin 45 being shown. A very slight further movement of the cam discs 35, 36 and 39 brings the long arm of the latch 40 against its roller 68 which lies behind and in line with the roller 66, as appears from FIGURE 9. Against the action of the spring 79, the latch 40 is swung around its pivot 41 with the result that the roller 42 is withdrawn from the cavity 78. It will be realised that the cam disc 35 is no longer effectively connected for rotation in the direction 73 with the cam disc 39. The roller 66 now lies slightly in front of the crest 85, and the cam disc 36 tends to turn backwardly, under the action of the weight of the frame of the implement, in the direction indicated at 84 in FIGURE 9. Any substantial movement in this direction is however prevented by the roller 66 which encounters the crest 85 and arrests the cam disc 35 in the position shown in FIGURE 10. Hence the implement is held in the transport position.

As shown in FIGURE 9, the pin 45 associated with the ratchet wheel 47 has meantime moved down towards a location near the bottom dead-centre, the spring 46 having supplied the energy for the movement. By the time the mechanism has reached the position shown in FIGURE 10, the pin 45 is very near the bottom dead-centre, the cam disc 39 having the crest 74 being free to turn with the shaft 33 and the ratchet wheel, without having to move also the composite cam device 34. In FIGURE 12 the position of the ratchet wheel 47 corresponding to the position shown in FIGURE 10 for the mechanism, can be seen. It will be realised that the continued reciprocation of the pawl 53 will cause the ratchet wheel 47 to continue to move in the direction 73 i.e. clockwise as viewed in FIGURE 9, in spite of the fact that such continued movement will be against the action of the spring 46. The pin 45 will move against the action of the spring 46 until the top-dead-centre is reached and just past, whereupon the spring 46 will itself cause the ratchet wheel to move rapidly away from the dead-centre position, whereby the pin 45 is brought back to the position illustrated in FIGURE 7 and shown also in FIGURE 11. As appears from FIGURE 11 the crest 74 of the cam disc 39 will now encounter the roller 67 which co-operates with this cam disc. Since the crest 74 will be arrested against its roller 67, the ratchet wheel will be prevented from moving under the action of the associated spring 46. As shown also in FIGURE 11, the latch 40 carried upon the cam disc 39, will have been restored almost to the position shown in FIGURE 6. The roller 42 of the latch 40 will still be riding upon the raised part of the cam disc 36 since it has been supposed that during the "charging" of the energy accumulator consisting of the spring 46, the implement has remained in the transport position, and hence the cam discs 35 and 36 have remained in the position shown in FIGURE 9.

Assuming that it is desired that the implement should be brought back to the working position, then it is simply necessary to pull once more upon the arm 62, again in the direction of the arrow 77 shown in FIGURE 6. This movement of the arm 62 will cause the roller 66 to be withdrawn from behind the crest 85 of the cam disc 35. It will, however, be noted that the movement of the roller 66 is restricted by the finger 81 so that the roller 67 co-operating with the crest 74 cannot escape the crest, and hence movement of the roller 66 does not simultaneously result in release of the cam disc 39 for movement under the action of the accumulator spring 46. Disengagement of the roller 66 from the crest 85 does, however, allow cam discs 35 and 36 to turn in the direction of the arrow 84 shown in FIGURE 11, under the action of the weight of the implement frame and that of the rake wheels. The movement in the direction 84 can continue until the cavity 78 in the cam disc 36 approaches the roller 42 of the latch 40. The roller 42 drops into the cavity 78 and arrests the cam disc 36, the latch 40 turning about its pivotal connection with the cam disc 39 whereby the latch 40 is restored to the position illustrated in FIGURE 6. It will be understood that it is undesirable for the cam disc 36 to make violent contact with the roller 67, and it may therefore be advantageous to arrange a shock absorbing device to operate in association with either, or both, of the parallelogram link structures 13, 14 whereby, when the frame and rake wheels fall to the working position, the last part of the movement is cushioned. Hence the position shown in FIGURE 6 can be regained without jarring the actuating mechanism.

After the actuating mechanism has been restored to the position shown in FIGURE 6, it will be realised that the rake wheels and the frame carrying the same have returned to the working position, the accumulator spring 46 being at that time already "charged." Hence if it is desired at once to restore the implement to the transport position, it is simply necessary to actuate once more the arm 62 whereupon the cycle which has just been described will reoccur.

The desired control movement for the arm 62 may be obtained with the aid of a cable 77A (see FIG. 2). One end of the cable may be anchored in the aperture 62A of the arm 62, the cable then passing over a roller 32A mounted on the bearing block 32. As appears from FIGURE 1, the cable 77A is appropriately mounted on, and in, the frame to enable such cable to be accessible from the front of the implement and the tractor towing the same.

By locating the actuating mechanism at the upper end of the shaft 24, it will be understood that when the associated ground wheel 12 is adjusted for the purpose of direction control, the actuating mechanism will similarly be adjusted in its setting about the axis of the bearing sleeve 25, whereby the drive from the ground wheel 12 to the spring accumulator will not be disturbed. Moreover, the disposition of the actuating mechanism just above the ground wheel 12 causes an additional load to be carried on this ground wheel, whereby liability for slipping is reduced. It will be further understood that the design of the accumulator spring and the ratchet and pawl mechanism which imparts energy thereto, will be such that the resistance to turning of the ground wheel 12 will not be great enough to produce undesired skidding.

Referring now to FIGURES 13 to 16, there is shown a modification to the actuating mechanism, in which the energy accumulator spring is supplied with energy from the ground wheel 12 with the aid of a reduction gear transmission, as distinct from the pawl and ratchet reduction transmission employed in the previously described mechanism. In the illustrated modification, the parallelogram link structure 14 is also somewhat modified. As far as parts are identical with those previously described, they are either omitted for simplicity of drawing, or, if included, are given the same reference numbers as previously employed. Only the parallelogram link structure 14 is illustrated, but it will be understood that the parallelogram link structure 13 may be modified in sympathy in order to ensure that both link structures can be interconnected and will operate in the same manner simultaneously.

As appears best from FIGURES 13 and 14, the vertically displaceable link of the link structure 14 now takes the form of a single link member 1A fixed upon the principal frame beam 4, instead of to the subsidiary frame beam 1B. As before, there are parallel top and bottom links 14A and 14B which are pivotally connected to either end of the link 1A. The other ends of the links 14A and 14B are pivotally secured to collars 91 and 92.

The ground wheel 12 is in this construction supported with the aid of a shaft 90 which is in the shape of a crank between its upper end 90A and lower end 90B.

The upper and lower aligned parts of the shaft 90 have annular brackets 93 and 94 fixed thereto. The collars 91 and 92 are turnably supported on the shaft 90, abutting upon and seating just above, the annular brackets 93 and 94.

The shaft 90 has secured thereto a U-shaped bracket 95 which is identifiable with the bracket 27 described in the previous construction. The bracket 95 thus has the two bearing blocks 31 and 32 which, inter alia, support the shaft 33 of the actuating mechanism. In FIGURE 13 only a part of the shaft 33 is shown, and the various cam discs located on the shaft between the bearing blocks are omitted for simplicity of illustration. It will, however, be understood that the actuating mechanism is as previously described except for differences that will now be indicated. Thus in place of the ratchet wheel there is a worm wheel 108, such worm wheel being, however, mounted for free rotation upon the shaft 33. Fixed upon the shaft 33 is an arm 99 carrying a pin 99A. A collar 99B is freely turnable upon the pin 99A and is rigidly connected with one end of a rod 99C the other end of which is pivotally connected to a centrally fulcrumed lever 97. The lever 97 is pivotally mounted at 98 upon a bracket 97A (FIGURE 13) fixed to, and extending laterally from the upper end of the shaft 90. The lever 97 has also connected thereto, the upper end of the accumulator spring 46, the lower end of which is attached to a bracket 96 effectively integral with the collar 92.

The cam disc 35 of the actuating mechanism is shown in FIGURE 14, and this disc is associated with a rod 100 comparable with the rod 38 of the construction previously described. The rod 100 is, however, anchored to a bracket carried at the end of an arm 101 rigidly attached to the lower end of the link 1A.

The ground wheel 12 has a bevel gear wheel 107 mounted thereon so as to turn therewith. The bevel 107 is in mesh with a further bevel 106 fast upon a shaft 105. The latter is supported in two bearings 103 and 104 carried by the shaft 90, and, located between these bearings, is a worm 102 which is in mesh with the worm wheel 108. The worm wheel 108 is formed with a recess 109 in one face, the recess being generally circular in shape but having four equi-angularly spaced lobe-shaped cavities 110. A roller 113 lies within the recess and is supported on a latch 111. The latch takes the form of a bell-crank lever, and the roller 113 is carried at the end of the shorter arm of the bell-crank lever, the latter being pivotally supported at 112 on the arm 99.

The longer arm 115 of the bell-crank lever is bent in the manner shown in FIGURES 15 and 16 and is adapted to engage a pin 114 secured to the U-bracket 95. The latch 111 is subject to the action of a spring 116 which is at one end fastened to the longer arm 115 of the bell-crank lever constituting the latch, and which is at the other end appropriately anchored to the arm 99. The spring 116 tends always to swing the latch in such direction as to cause the roller 113 thereof to follow around the edge of the recess 109.

In FIGURES 13 to 16 the position is shown where the implement is in its working position and where the spring 46 has been tensioned so that it is fully "charged." Thus the position shown for the mechanism in FIGURE 16 is the corresponding position for the mechanism shown in FIGURE 7. Upon moving the arm 62 in the direction of the arrow 77 shown in FIGURE 14, cam disc 35 will be freed for turning in the direction shown by the arrow 73. The spring 46 will contract and a powerful upward pull will be applied to the rod 99C, whereby the rod 100 (corresponding to the rod 38 of the previously described construction) will be powerfully raised, thus lifting the arm 101 and causing the frame beam 1 to be lifted so that the implement is brought to the transport position. The position of the pin 99A is at all times substantially 180° different from the corresponding position of the pin 45 of the previous construction. Thus at the end of the stroke for bringing the implement to the transport position, the pin 99A will be near top dead-centre as compared with the position of the pin 45 where it will be near bottom dead-centre. From the top dead-centre position of the pin 99A, the latter will be moved in the direction 73 for the purpose of recharging the accumulator spring 46 by the action of the worm and worm wheel. It will be appreciated that so long as the implement is travelling over the ground, the ground wheel 12 will be rotating and hence, via the gear transmission 106 and 107, the worm 102 is turned. Thus the worm wheel 108 will be rotating also in the direction of the arrow 73. At the top dead-centre position, the roller 113 under the action of the spring 116 will pick up in one of the lobe-shaped cavities 110 formed in the worm wheel, and the drive to the worm wheel will be effectively transferred through the latch 111 to the arm 99, whereby the latter will move the pin 99A downwardly and thereby extend the spring 46. Thus the recharging of the spring 46, just as in the previous construction, continues whilst the implement is being transported with the frame thereof raised. When the spring 46 has been completely made ready for another operation, the arm 99 will have returned to the position shown in FIGURE 16. In so returning, the arm 115 of the latch 111 will engage the pin 114 and hence the latch will lift the roller 113 clear of the cavity in which it had rested. This permits the worm wheel 108 to be further rotated by the worm 102, such movement of the worm wheel being ineffective since the worm wheel is free upon the shaft 33. It will be appreciated that the operation of the actuating mechanism is effectively the same as that described with reference to FIGURES 1 to 12.

Referring now to FIGURES 17 to 20, there is shown a modification of the actuating mechanism in which hydraulic mechanism is employed. As appears from the plan of FIGURE 17, the implement has the frame and rake wheels carried upon the ground wheels through the intermediary of parallelogram link structures. These link structures are substantially the same as those illustrated in FIGURE 1 of the drawings. Thus the link structure 14 includes the two brackets 4A and 4B mounted on the transverse subsidiary beam 4 and pivotally connected with the upper and lower links 14A and 14B. The latter links are pivotally connected with the bearing sleeve 25 which constitutes the fixed vertical link of the link structure. The shaft 24 which supports the ground wheel 12 is the same as that described with reference to FIGURES 1 to 4. The upper link 14A is, however, in this construction extended through the bracket 4A so as to form a live pivot 120A on which there is fixed an arm 120. The arm 120 has the same function as the arm 17 shown in FIGURE 4, and is thus similarly joined to the rod 18 for the actuation of the companion parallelogram link structure 13 (not illustrated in FIGURES 17 and 18). The arm 120 is, however, downwardly extended and is pivotally connected with a piston rod 121. The latter enters an operating cylinder 123 secured beneath the beam 4, the piston rod having a piston 122 (see FIG. 20).

A pressure tank 124 is secured to the bearing sleeve 25, such tank being intended for the reception of hydraulic pressure medium and having a space 125 at the top which contains a gas maintained under pressure by the hydraulic pressure medium. The hydraulic pressure medium is derived from a pump 126 disposed in relation to the ground wheel 12 in such manner that when the ground wheel 12 rotates the pump 126 operates. Adjacent the pump 126 there is a storage tank 127 for the hydraulic pressure medium. A pressure pipe 128 is connected to the pressure side of the pump and a return pipe 128A is connected to the storage or reservoir tank 127. A slide valve 132 is mounted upon the sleeve 25, and there is also mounted thereon a control cylinder 131. A bracket 143A extends from the cylinder 123 and supports a rotary valve 143. All these parts may be seen in FIGURE 18, and in FIGURE 20 there is a diagrammatic sectional showing of these parts. Attention is now directed to FIGURE 20. It will be seen that the slide valve 132 comprises a cylinder 132A housing two spools 133 and 134 connected by a rod 129. The cylinder 132A has three ports one of which is connected to a return pipe 135A extending to the return pipe 128A. The next port is connected with the pressure pipe 128, and the last port is in communication with a conduit 135 having a non-return valve 135B therein. The conduit 135 communicates with a pipe 124A leading to the pressure tank 124, with a pipe 131A leading to the control cylinder 131, and with a pipe 143B leading to the rotary valve 143.

The control cylinder 131 has a plunger 130 mounted therein and urged upwardly by a spring 136. The plunger has a plunger rod 137 connected to the spool 134 of the slide valve 132. Effectively fixed to the control cylinder 130, there is a nipple supporting a ball 139 which is urged towards the plunger rod 137 by a spring 140, the effectiveness of which can be adjusted with the aid of a set screw 141. The ball 139 is adapted to co-operate with an annular groove 138 formed in the plunger rod.

As will be seen from FIGURE 20, the rotary valve 143 has a cylindrical body with two pairs of aligned ports. The ports of one aligned pair are respectively connected with the pipe 143B and a pipe 142 leading to one end of the operating cylinder 123. The ports of the other aligned pair are respectively connected to the return pipe 128A and a branch pipe 144 which parallels the pipe 142. The rotatable plug of the rotary valve has a single port extending therethrough and capable of being brought into register with either of the described pairs of ports of the cylindrical valve body.

In the illustrated position of the mechanism shown in FIGURE 18, the implement is in the working position and to bring the implement to the transport position the arm 120 has to move powerfully in the direction shown by the arrow 120B. It will be supposed, in order to explain the operation of the mechanism, that the plug of the rotary valve 143 is not in the position shown in FIGURE 20 but is turned through 90° so that the port thereof effectively interconnects the pipes 144 and 128A but disconnects the pipes 142 and 143B. It will furthermore be supposed that the hydraulic pressure medium in the pressure tank 124 is compressing the body of gas 125 therein to a pressure which has not yet reached the maximum that is desired. As the implement travels in its working position, the ground wheel 12 will be rotated and hence the pump 126 will be effective to deliver hydraulic pressure medium through the pressure pipe 128. In the illustrated position of the slide valve 132 the spools thereof are situated in such a way as to ensure that the pressure medium delivered to the pipe 128 passes through the slide valve into the conduit 135 from whence it is delivered to the pressure tank 124. The pressure in the tank 124 therefore continues to build towards the maximum that is required. The pressure resulting from the continued supply through the conduit 135, becomes effective on the plunger 130 due to the pipe 131A. The plunger 130 cannot move because of the spring 136 which urges it into the illustrated position, and because of the ball 139 which is then located in the annular groove 138 under the action of the spring 140. When the pressure in the pressure tank has reached the desired maximum, the pressure upon the plunger 130 is such as to overcome the resistance due to the spring 136 and to the spring-pressed ball 139. As soon as the plunger 130 begins to move, the ball 139 is lifted clear of the groove 138 and the resistance to motion due to the ball is then much reduced so that the plunger 130 can be displaced smoothly downwards, causing the spools of the slide valve 132 to move to a downward setting in which the spools effectively interconnect the pressure pipe 128 with the return pipe 135A and isolate the conduit 135. The desired maximum pressure is now available from the pressure tank 124, such pressure being in the region of about one atmosphere (gauge). It will be appreciated that ignoring hydrostatic effects, the hydraulic pressure medium will be available for use from the pipe 143B under the effect of the pressure of the compressed body of gas 125. Hence this compressed body of gas acts as a resilient gas cushion and constitutes an energy accumulator comparable with the spring previously described.

If it is now desired to bring the implement to the transport position, and hence powerfully to move the arm 120 in the direction 120B, it is now only necessary to bringing the rotary valve 143 to the setting illustrated in FIGURE 20. Hydraulic pressure medium at once passes from the pressure tank 124 through the rotary valve into the pipe 142, from whence it is fed under pressure into the operating cylinder 123. As a result the piston 122 is displaced powerfully and the desired movement of the arm 120 is achieved. The supply of hydraulic working medium to the cylinder 123 in order to move the piston 122 for the actuation of the arm 120, will produce a progressive lowering of the pressure available from the pressure tank 124 since the body of trapped gas 125 will expand. When the pressure falls, the spring 136 can restore the plunger 130 to the illustrated position, then the slide valve will return to the illustrated position, in which position it will remain under the action of both the spring 136 and the ball 139 which is now seated in the groove 138. Hydraulic pressure medium will, therefore, now be supplied again from the pipe 128 to the pressure tank 124, until the desired maximum pressure is once more reached.

It will now be understood that when the implement has been brought to the transport position it will be held in that position so long as the rotary valve 143 remains in the position illustrated in FIGURE 20. Moreover the available energy in the energy accumulator constituted by the gas cushion in the pressure tank 124 will be maintained at the desired level ready for a further subsequent operation.

If it is now desired to lower the implement to the working position, then it is simply necessary to turn the rotary valve 143 through 90° away from the position illustrated in FIGURE 20. The pressure tank 124 will now be isolated from the operating cylinder 123 and the latter will be connected via the pipe 144 and the rotary valve, to the return pipe 128A. Under the action of the weight of the implement frame, the arm 120 will move back to the position illustrated in FIGURE 18 and hence the piston 122 will move back towards the position illustrated in FIGURE 20, the hydraulic pressure medium being expelled from the cylinder 123 and returned to the reservoir 127. Hence it will be understood that by progressively moving the rotary valve 143 through 90°, the frame of the implement can be either raised or lowered.

The operation of the rotary valve 143 is effected with the aid of a device which will now be described. The plug of the valve is carried fast upon a shaft 145 (see FIG. 19), such shaft having fixed thereon a ratchet wheel 146 provided with four equi-angularly spaced teeth 147. A lever 148 is mounted for free pivotal movement about the shaft 145, the lever pivotally supporting a pawl 149 which is urged into peripheral contact with the ratchet wheel 146 by a spring 150. The free end of the lever 148 is connected with a tension spring 151 the other end of which is anchored to an extension 151A of the bracket 143A. A stop 153 is also mounted on the extension 151A and there is a further stop 155 extending from the bracket 143A. The free end of the lever 148 is connected by a cable 154 which extends through and along the frame of the implement to a location at the front end of the same, whereby the implement can be controlled by the tractor driver.

When the cable 154 is untensioned, the lever 148 occupies substantially the position illustrated in FIGURE 19, the spring 151 tending always to move the lever in the direction shown by the arrow 152 whereby the lever is brought into engagement with the stop 153. At this time the pawl 149 is engaging behind one of the teeth of the ratchet wheel 146. The rotary valve 143 is now in one of its desired positions of adjustment such as for example, that shown in FIGURE 20. If now the cable 154 is pulled, the lever 148 will swing about the shaft 145 against the action of the spring 151, the pawl 149 causing the ratchet wheel 146 to be turned therewith. Movement of the lever 148 can continue until such lever engages the stop 155. On this engagement, the lever will have travelled through 90° and will have carried the ratchet wheel 146 through 90°. Likewise the plug of the rotary valve 143 will have been turned through 90° so that a new setting has been reached. Upon release of the cable 154 the spring 151 will assert itself, and will cause the lever 148 to return to the position illustrated in FIGURE 19, the pawl 149 riding over the ratchet wheel until it engages the next tooth, but being ineffective to move the ratchet wheel on this return movement. With the mechanism just described it will be appreciated that on successive pulls of the cable 154, the rotary valve can be adjusted stepwise in the way desired.

Referring now to FIGURE 21, there is shown an alternative form of actuating mechanism including an energy accumulator which stores energy in the form of the kinetic energy of a rotating mass. The illustration in FIGURE 21 is largely diagrammatic, but the underlying principle, will be readily apparent therefrom. The view taken is similar to the view shown in FIGURE 14, and as in the case of FIGURE 14, it will be assumed that the ground wheel 12 is connected with the principal frame beam 1B through a parallelogram link structure 14. The vertical movable link of the structure is, as seen in FIGURE 14, indicated at 1A, there being the upper and lower links 14A and 14B pivotally connected therewith. For ease of illustration it has been supposed that the plane of the wheel 12 remains in a fixed setting with reference to the implement frame 1, so that the ground wheel 12 can be simply mounted for rotation about a horizontal axis formed by bending the lower end of a vertical shaft 160. The latter constitutes at its upper part the fixed vertical link of the parallelogram link structure and has the links 14A and 14B pivotally connected to fixed collars 160A and 160B thereon. The link 1A carries an arm 166 which projects therefrom. An arm 185 is at its lower end mounted upon the end 187 of the link 14B.

The shaft 160 rotatably supports a horizontally extending shaft 173 on which there is fixedly mounted a flywheel 161. There is also fixedly mounted on the shaft 173 a pinion 162 combined with a bevel gear 172. The latter meshes with a bevel gear 171 carried upon a shaft 170 which lies in spaced relation from the shaft 160 but which is parallel thereto. A non-positive clutch 169 couples the shaft 170 with an aligned shaft 168. The lower end of the latter has a bevel pinion 174 fixed thereto, which meshes with a crown wheel 175 formed on one side of the ground wheel 12.

It will now be understood that when the implement travels over the ground and the ground wheel 12 turns, the crown wheel 175 will cause the bevel pinion 174 to be rotated with consequent turning of the shaft 168. It will be noted that one complete revolution of the ground wheel 12 will cause several revolutions of the shaft 168. The non-positive clutch 169 is set so that it slips when more than a pre-determined torque would be otherwise transmitted therethrough. Via the clutch 169 the shaft 170 is driven so that the bevel gear 171 drives the bevel gear 172. The flywheel 161 is therefore set in motion. The overall velocity ratio as between the ground wheel 12 and the shaft 173 is such that when the implement is proceeding at a normal speed and when there is no slip in the clutch 169, the flywheel 161 turns at a certain speed. Assuming that the implement is starting from rest and the flywheel 161 is stationary, then it will be realised that initially there will be a great degree of slip in the clutch 169 since the torque necessary to bring the flywheel to said certain speed would be very great if such speed were to be immediately reached. If, in a way which will be explained hereinafter, energy is drawn from the rotating flywheel, the speed of rotation will correspondingly decrease. Assuming that the implement continues to move over the ground at steady rate, the energy drawn from the flywheel system, will be replaced by accelerating the flywheel with the aid of torque derived from the ground wheel 12. Hence the flywheel arranged in this manner operates as an energy accumulator tending always to maintain a particular energy level, and being "charged" whenever energy is withdrawn from the system.

Near to the pinion 162, there is arranged an arcuate rack back 163, the teeth of which are formed as a series of projecting pins 164. The number of pins is the same as the number of teeth upon the pinion 162. One end of the rack bar 163 is supported by an integral arm 181, pivotally supported at 165 upon the arm 166. A spring 182 is at one end anchored to the rack bar and at the other end to the arm 166, such spring tending always to move the rack bar about the pivotal mounting 165 in an anti-clockwise direction as seen in FIGURE 21. The free end of the arm 181 is tapered and is engaged by a roller 180 carried by one arm 178 of a three-armed lever pivotally mounted at 176 upon the arm 166. The arm 177 of the three-armed lever is connected with an operating cable 183. The third arm 179 of the three-armed lever is formed with a hook-like end.

The position of the mechanism shown in FIGURE 21 corresponds to the working position of the implement, so that the frame 1 and the link 1A are in their lower position. It will be supposed that the implement is travelling over the ground and that the ground wheel 12 is maintaining the flywheel 161 at a steady maximum speed. The pinion 162 will thus be rotating with the flywheel in the direction shown by the arrow 167. If now the cable 183 is pulled in the direction shown by the arrow 184 in FIGURE 21, then the arm 177 will cause the three-armed lever to be swung about its pivot 176. Hence the arm 178 carrying the roller 180 will move downwardly and will cause the tapered end of the arm 181 to move correspondingly downwardly about the pivot 165. The rack bar 163 will therefore swing about the pivot 165 in a clockwise direction whereby the pins 164 of the rack bar will be brought into mesh with the teeth of the pinion 162. The pinion 162 will at once begin to drive the rack upwardly, the rack being drawn into continued engagement with the pinion as the result of the reaction to the driving force exerted on the rack by the pinion. The raising of the rack will cause the arm 166 to be raised whereby the link 1A together with the frame will be raised. The links 14A and 14B will swing about their pivotal attachments to the collars 160A and 160B, and as a result the arm 185 will turn in the direction shown by the arrow 188. The relative arrangement of the parts is such that when the pinion 162 is lifting the last pin 164 of the rack bar 163, a pin 189 carried at the free end of the arm 185 enters beneath the hook portion at the end of the arm 179 thereby locking the parallelogram link structure in the raised position corresponding to the transport position of the implement. The rack bar 163 is now effectively clear of the pinion 162. The raising of the rack bar by the pinion 162 will have required energy which energy will have been given up by the rotating mass consisting of the flywheel 161. Thus the latter will be correspondingly decelerated. This may have resulted in temporary slipping of the clutch 169. As soon as energy is no longer being drawn from the rotating flywheel, it will commence accelerating by virtue of the torque that is being transmitted from the ground wheel 12 assuming that the implement continues to move across the ground. Hence the energy accumulator consisting of the flywheel will be "recharged."

If now it is desired that the implement shall be returned to the working position, it is simply necessary to pull once more upon the cable 183 whereby the hook 179 will be released from the pin 189 and the mechanism will be free to return to the position illustrated in FIGURE 21 under the action of the weight of the implement frame, ready for the next occasion when it is desired to repeat the cycle by raising the frame to the transport position.

Referring now to FIGURES 22 to 24, there is shown an implement for hay raking to which the actuating mechanism has been applied for the purpose of assisting in bringing the implement from one working position to another.

As shown in FIGURES 22 to 24 the implement comprises a frame 190, which is supported on three ground wheels 191, 192 and 193. The frame 190 is provided with four rake wheels 194, 195, 196 and 197, which are secured to a frame beam 198. The frame further comprises a frame beam 199, which is secured to the front end of the frame beam 198 and has a portion 200 extending parallel to the frame beam 198. The rake wheels are mounted on the frame beam 198 with the aid of four brackets 201 to which are hingedly secured supporting arms 203 by means of vertical hinge pins 202. The ends of the arms 203 are provided with bearings 204 in which cranks 205 are journalled, the cranks carrying the rake wheels at their free ends. A rod 206 lies along and over the beam 198, the rod being so supported on the beam as to be movable axially. The cranks 205 are connected with the rod 206 by means of springs 207 and chains 208. The rod 206 is connected with the aid of a chain 209 to an arm on a shaft 210 which has a lever 210A fast thereon to permit turning thereof. By turning the shaft 210 the rod 206 can be moved axially, whereby the cranks 205 are turned in their bearings 204 and the rake wheels 194 to 197 are displaced vertically with respect to the frame 190.

The supporting arms 203 are provided, near their vertical hinge pins 202, with levers 211, which are connected with a coupling bar 212 by means of vertical pivots 213. The coupling bar 212 is connected to a sector plate 215 by a rod 214 connected with one of the levers 211, the sector plate being turnable about a vertical axle 216, which supports the ground wheel 192. The axle 216 has rigidly secured to it a locking lever 217, which can be locked to the sector plate 215 in any one of the locations indicated at 218, whereby the plate 215 can be adjustably fixed in relation to the ground wheel 192.

The frame beam 198 carries a bracket 219 in which there is a hole. Movement of the coupling bar 212 can be prevented by means of a locking pin 220 inserted in the hole 34 in the bracket 219 and one of a series of holes 221 in the coupling bar 212. Locking of the coupling bar results in the holding of the ground wheel 192 in a fixed position in relation to its swivel axis afforded by the axle 216, and results also in the locking of the rake wheels against swinging about the axes of their hinge pins 202. The ground wheel 192 forms in the fixed position a direction-controlling ground wheel which is located at the rear end of the implement with reference to the direction of travel of the same.

In order to move the implement whilst in its working position shown in FIGURE 22, the front end of the frame beam 199 is provided with a draw-bar 222, which is connected with the vertical swivel axle 191A of the ground wheel 191, so that this ground wheel constitutes a steerable wheel. With the direction of travel indicated by the arrow V in FIGURE 22, the implement acts as a side-delivery rake, in which the rake wheels all co-operate to deliver the crop laterally. In this working position also the ground wheel 193, which can be swung about its swivel axle 223 with respect to the frame 190, is locked against such swinging movement by means of a locking device 224. In the working position shown in FIGURE 22 the ground wheels 192 and 193 will thus both act as direction control wheels.

The implement can be brought to a second working position, in which each rake wheel, independently of the other rake wheels, works a strip of ground. This second working position is shown in FIGURE 23. This working position can be attained by releasing the locking pin 220 and by subsequently moving the rake wheels into their positions shown in FIGURE 23 by turning them about their vertical hinge pins 202. During this turning movement, because of the connection between the rake wheels and the ground wheel 192 afforded by the coupling bar 212, the plane of the ground wheel 192 will be set in a new position. In this second working position the rake wheels and the ground wheel 192 can be locked against turning about the hinge pins 202 and axle 216 respectively, by the locking pin 220. In the new working position the implement is moved in the direction of the arrow V shown in FIGURE 23, which direction is automatically set for the ground wheel 192. The setting of the ground wheel 192 can be adjusted to some extent relatively to the rake wheels and the frame, by releasing the locking lever 217 from one location 218 and bringing it to another location 218. In order to adjust the rake wheels vertically in this working position with the aid of the rod 216, the chains 208 are guided over jockey pulleys 226. During changing over from one working position to the other, each spring 207 and a portion of the associated chain 209 will turn with the rake wheel about its hinge pin, whilst the distance between each crank 205 and the fastening to the rod 206 effectively remains the same. The pulleys 226 are each mounted on a pin, which is spaced from the hinge pin 202 by a distance such that part of the periphery of each pulley 226, over which the chain is guided, is located just above the pin 202. By means of the assembly comprising the rod 206 and the lever 210A, the rake wheels can be lifted from the ground in both working positions to an extent such that a transport position can be attained, in which the rake wheels are clear of the ground.

The implement may be brought to a third working position, in which the rake wheels are arranged in two groups. For this purpose the portion 200 of the frame beam 199 is provided with two bearings 227, in which the cranks 205 of the rake wheels, for example 196 and 197 can be mounted. A rod 228 is slidably arranged upon the portion 200 and is connected with an arm fixed on the shaft 210 by means of a chain 229. Hence the rake wheels supported on the portion 200 of the frame beam 199 can be vertically adjusted by means of the lever 210A and, if desired, can be brought to a transport position.

In the third working position, the rake wheels 194 and 195 are located in the position and setting shown in FIGURE 22, whilst the rake wheels 196 and 197 have their cranks mounted in the bearings 227 and 228 so that their setting is similar to that of the rake wheels 194 and 195. Hence two groups of rake wheels are afforded, the wheels of each group co-operating with one another to work a separate strip of ground, the implement then acting as a swath turner.

The implement so far described with reference to FIGURES 22 and 23 can be brought from the first to the second working position and vice versa by manually displacing the rod 212 and appropriately adjusting the ground wheel 193. The displacement of the rod 212 can be alternatively effected with the aid of the actuating mechanism described with reference to FIGURES 1 to 12. As seen best in FIGURE 24 the frame beam 199 is fixed to the sleeve 25 of the actuating mechanism, the pin 37 of the latter having an arm 230 mounted thereon and secured to one end of a cable 231. The latter passes over a jockey pulley 232 mounted on the sleeve and over a further jockey pulley 233 (see FIG. 22), the other end of the cable being anchored to the rod 212. A spring 225 is at one end attached to the rod 212 and is at the other end attached to a part of the frame of the implement.

The actuating mechanism has the operating lever 62 in this case extended as at 234. The actuating mechanism, via the cable 231, holds the rod 212 in the position shown in FIGURE 22, and the locking pin 220 may be dispensed with. The spring 225 is fully extended, but is unable to be effective. If now the lever 234 is pulled, the cable 231 is released and the spring 225 now moves the rod 212 to the position shown in FIGURE 23. On pulling the lever 234 (the pin 220 having been removed) the actuating mechanism will via the cable 231, restore the implement to the position shown in FIGURE 22, against the action of the spring 225.

What we claim is:

1. An implement for displacing material lying on the ground comprising a frame having a plurality of rake wheels thereon, a ground wheel supporting engagement means between said wheel and said frame, rocker arm means intermediately pivotally supported on said engagement means, one terminal portion of said arm means being connected to said frame and the other terminal portion being connected to said engagement by means of a spring, an actuating means inter-connecting said rocker arm and said ground wheel and a ratchet between said rocker arm and said engagement means, whereby energy may be stored in said spring which may be released to cause elevating of said frame.

2. An implement for displacing material lying on the ground and provided with a coupling device adapted for connection to a tractor or the like, comprising a frame connected to said coupling device, a plurality of rake wheels, means for mounting said rake wheels on said frame including means for maintaining said rake wheels in a working position together with means for bringing said rake wheels from said working position to another position and for maintaining the same in said other position, said latter means including a ground wheel supporting engagement means between said wheel and said frame, an actuating means being connected to said engagement means by means of an energy-accumulator, a second actuating means interconnecting said first actuating means and said ground wheel, whereby by means of said first actuating means energy may be stored in said energy-accumulator, which may be released to cause changing of the position of the rake wheels.

3. The structure of claim 2, wherein said energy-accumulator includes a spring.

4. The structure of claim 2, wherein said energy-accumulator includes a flywheel.

5. The structure of claim 3, wherein one of said actuating means includes a pitman.

6. The structure of claim 3, wherein one of said actuating means includes gearing means.

7. The structure of claim 3, wherein means is provided for holding said rake wheels in an elevated position.

8. The structure of claim 7, wherein manual release means is provided for releasing said last named means.

9. The structure of claim 3, wherein said second actuating means includes a pitman.

10. The structure of claim 3, wherein said first actuating means includes ratchet means operatively connected to said spring and means for manually releasing said ratchet means.

11. The structure of claim 3, wherein said spring is actuated by a cam disk means.

12. The structure of claim 11, wherein said cam disk is provided with a manually operated latch for holding or releasing the said cam disk means, said cam disk means being operatively connected with said second actuating means.

13. The structure of claim 11, wherein said cam disk means comprises at least two cam disks mounted side-by-side.

14. The structure of claim 13, wherein one of said cam disks is of greater outside dimensions than the other of said cam disks.

15. The structure of claim 2, wherein said energy-accumulator includes a pressure tank for the accumulation of gas, one of said actuating means including a piston and cylinder, a fluid line means connecting said cylinder to said tank.

16. The structure of claim 2, wherein one of said actuating means includes a piston and cylinder, a tank and means hydraulically connecting said cylinder and tank.

17. The structure of claim 2, wherein said energy-accumulator includes a tank means for maintaining gas pressure in said tank, hydraulic means for maintaining said gas pressure in said tank, and means for changing the position of said rake wheels by the pressure of gas in said tank.

References Cited in the file of this patent

UNITED STATES PATENTS

| | | |
|---|---|---|
| 567,629 | Young | Sept. 15, 1896 |
| 1,031,134 | Markmann et al. | July 2, 1912 |
| 1,130,059 | Brewer | Mar. 2, 1915 |
| 2,470,730 | Stevenson | May 17, 1949 |
| 2,704,021 | Brundage | Mar. 15, 1955 |
| 2,712,277 | Rutter | July 5, 1955 |
| 2,712,723 | Ryan | July 12, 1955 |
| 2,836,953 | Van der Lely et al. | June 3, 1958 |